United States Patent [19]
Landry et al.

[11] Patent Number: 5,434,997
[45] Date of Patent: Jul. 18, 1995

[54] METHOD AND APPARATUS FOR TESTING AND DEBUGGING A TIGHTLY COUPLED MIRRORED PROCESSING SYSTEM

[75] Inventors: John A. Landry, Tomball; Jeff W. Wolford; Walter G. Fry, both of Spring; Roger E. Tipley, Houston, all of Tex.

[73] Assignee: Compaq Computer Corp., Houston, Tex.

[21] Appl. No.: 955,980

[22] Filed: Oct. 2, 1992

[51] Int. Cl.⁶ .................... G06F 11/00; G06F 15/40
[52] U.S. Cl. ............................... 395/575; 371/68.3; 371/15.1
[58] Field of Search .......... 395/575; 364/228.3, 364/228.8, 230, 230.2, 230.4; 371/68.3, 36, 14, 15.1

[56] References Cited
U.S. PATENT DOCUMENTS

| | | | |
|---|---|---|---|
| 4,590,549 | 5/1986 | Burrage et al. | 364/131 |
| 4,635,186 | 1/1987 | Oman et al. | 364/200 |
| 4,672,537 | 6/1987 | Katzman et al. | 364/200 |
| 4,785,453 | 11/1988 | Chandran et al. | 371/68 |
| 4,816,990 | 3/1989 | Williams | 364/200 |
| 4,849,979 | 7/1989 | Maccianti et al. | 371/68 |
| 4,916,470 | 4/1990 | Berg | 364/200 |
| 4,916,695 | 4/1990 | Ossfeldt | 371/9.1 |
| 4,965,717 | 10/1990 | Cutts, Jr. et al. | 364/200 |
| 5,005,174 | 4/1991 | Bruckart et al. | 371/68.3 |
| 5,016,249 | 5/1991 | Hurst et al. | 371/16.1 |
| 5,054,026 | 10/1991 | Tsubota | 371/68.3 |
| 5,136,595 | 8/1992 | Kimura | 371/68.3 |
| 5,155,729 | 10/1992 | Rysko et al. | 371/9.1 |
| 5,195,101 | 3/1993 | Guenthner et al. | 371/68.3 |
| 5,202,980 | 4/1993 | Morita et al. | 395/575 |
| 5,231,640 | 7/1993 | Hanson et al. | 371/68.3 |
| 5,263,034 | 11/1993 | Guenthner et al. | 371/68.3 |

FOREIGN PATENT DOCUMENTS

0186006 7/1986 European Pat. Off.
0286856 10/1988 European Pat. Off.

OTHER PUBLICATIONS

P. A. Bernstein, Sequoia: A Fault-Tolerant Tightly Coupled Multiprocessor for Transaction Processing, Feb. 1988, pp. 37–45.

Primary Examiner—Hoa T. Nguyen
Assistant Examiner—Norman M. Wright
Attorney, Agent, or Firm—Pravel, Hewitt, Kimball & Krieger

[57] ABSTRACT

A method and apparatus for operating tightly coupled mirrored processors in a computer system. A plurality of CPU boards are coupled to a processor/memory bus, commonly called a host bus. Each CPU board includes a processor as well as various ports, timers, and interrupt controller logic local to the respective processor. The processors on one or more CPU boards are designated as master processors, with the processors on the remaining CPU boards being designated as mirroring or slave processors. A master processor has full access to the host bus and a second, multiplexed bus for read and write cycles, whereas the slave processors are prevented from writing to any bus. The slave processors compare write data and various control signals with that generated by its respective master processor for disparities. The system includes interrupt controller synchronization logic to synchronize interrupt requests as well as timer synchronization logic to synchronize the timers in each of the master and slave CPUs to guarantee that the master and slave CPUs operate in lockstep.

19 Claims, 9 Drawing Sheets

OUTPUTS:
MCLKEN = D * / (IRQCHG + PICIO)

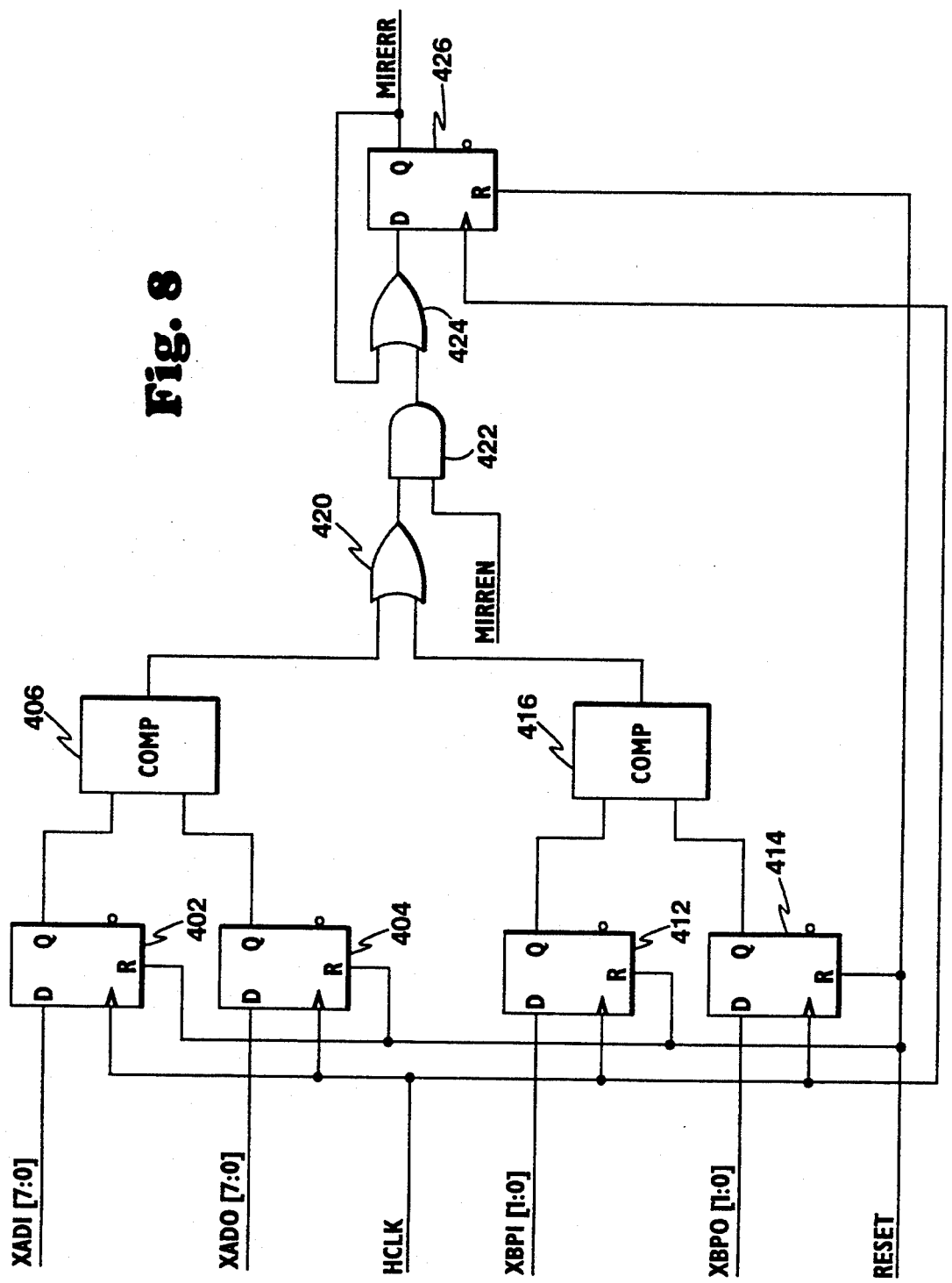

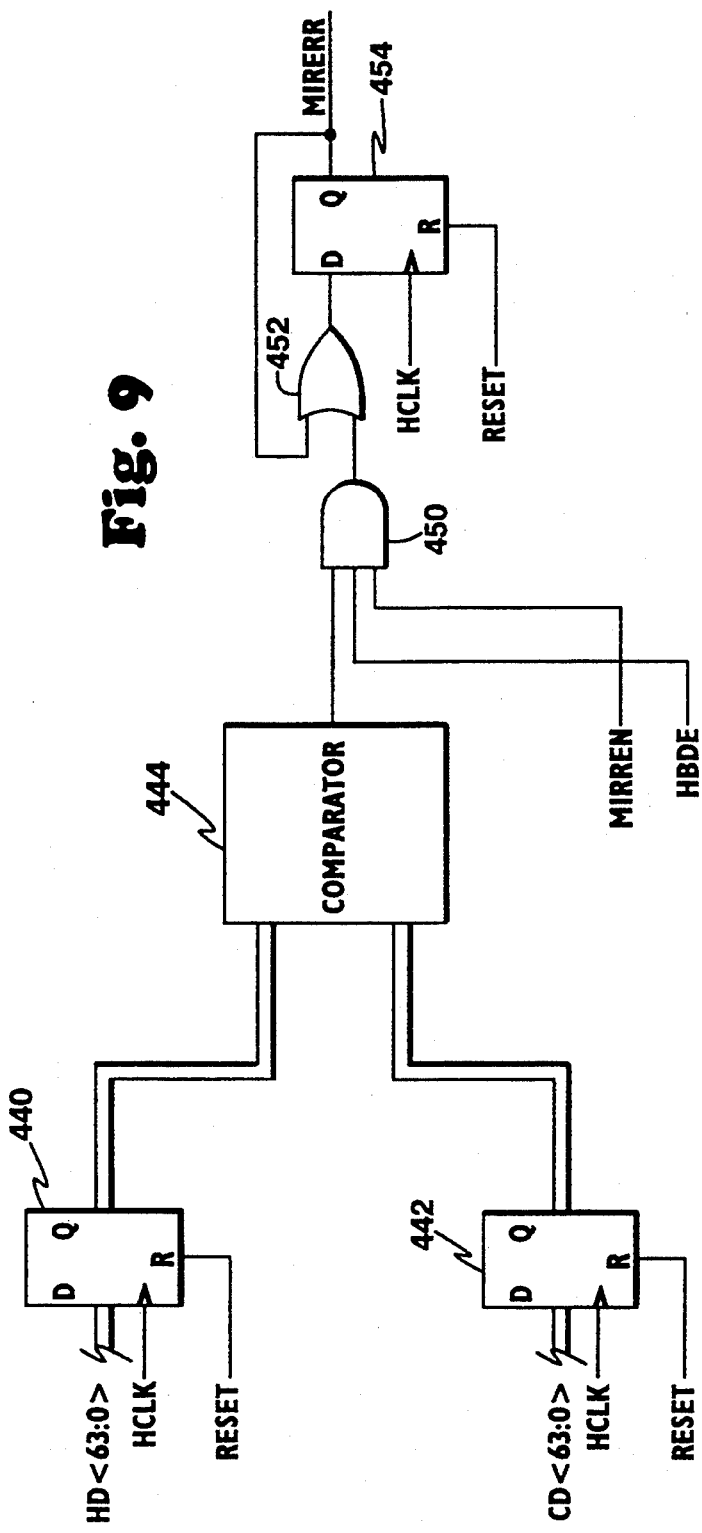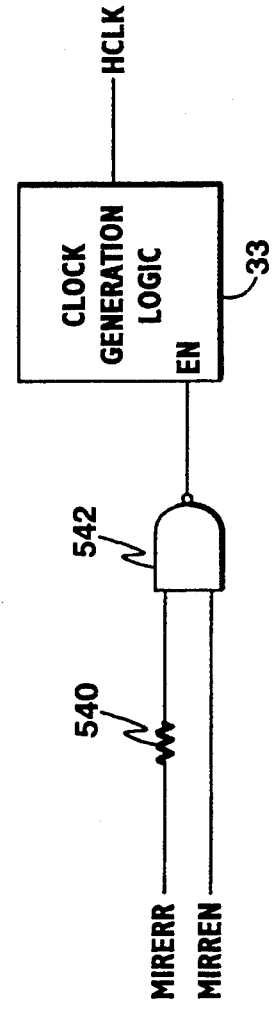

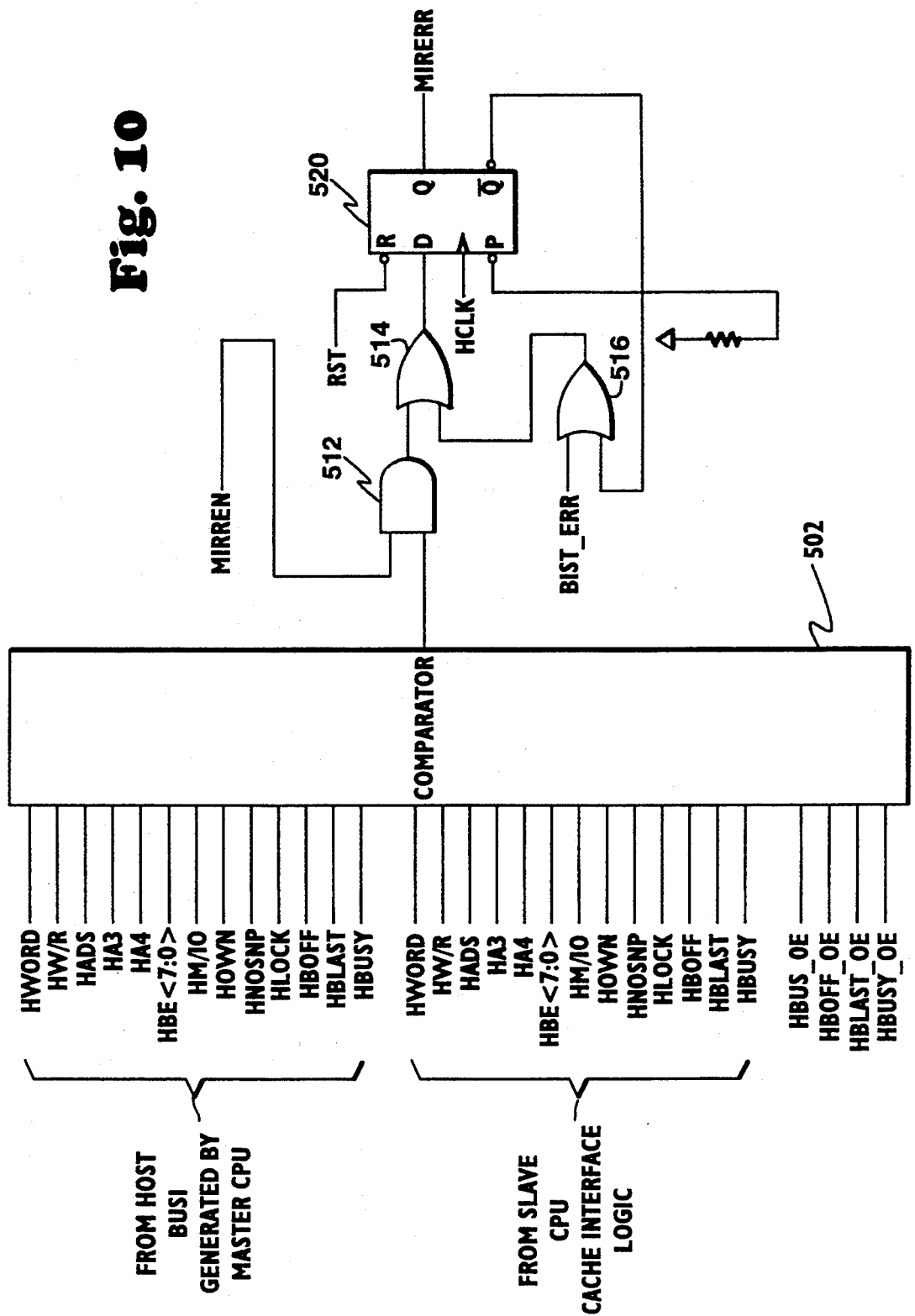

METHOD AND APPARATUS FOR TESTING AND DEBUGGING A TIGHTLY COUPLED MIRRORED PROCESSING SYSTEM

FIELD OF THE INVENTION

The present invention relates to a method and apparatus for operating tightly coupled, mirrored processors for design debug and testing purposes.

DESCRIPTION OF THE RELATED ART

Computer systems are becoming increasingly more complex and versatile. As computer systems increase in complexity, system design and debugging becomes more lengthy and costly. The debugging of a hardware system and the detection and localization of defects can be difficult. This is especially true for CPU (central processing unit) boards. When testing a CPU board for defects, in many cases an error caused by an instruction will not become evident to the operator until a time much later than when the instruction causing the error occurred. The respective instruction may cause faulty data to be stored, and this faulty data may not affect system performance until a much later time, making it difficult to localize the instruction or operation that caused the error. Therefore, a method and apparatus is desired to which can recognize immediately when an error or fault occurs on a CPU board to allow an operator to easily localize the error and correct the defect.

Background on interrupts in computer systems is deemed appropriate. Most computer systems today are interrupt driven, meaning that a peripheral or I/O device gains access to the services of the microprocessor by asserting an interrupt. An interrupt essentially acts as an external asynchronous input to the processor that informs the processor that it should complete its current instruction and then fetch a new routine that is used to service the requesting device. Once the interrupt servicing is complete, the processor resumes where it left off.

Interrupt driven computer systems generally include a device referred to as an interrupt controller that functions as an overall manager of the interrupt environment. One example of an interrupt controller used in personal computer systems is the Intel 8259 Programmable Interrupt Controller. The 8259 interrupt controller receives interrupt requests from the peripheral equipment and I/O devices, prioritizes the requests, and issues an interrupt to the CPU. The processor performs the requested interrupt service routine to service the requesting device. When the interrupt service routine completes, the processor returns to its state prior to the interrupt.

Since an interrupt is an event asynchronous to the processor, there is no guarantee that an interrupt will reach all of the processors in a multiprocessor system at the same time. Accordingly, if there are multiple processors operating in a computer system then there is no way to assure that the processors will be in the same state at the time they acknowledge the interrupt. Additionally, due to an interrupt's asynchronous nature there is no guarantee that two processors will execute the exact same number of instructions in the period between the time when the interrupt was received and the time that it was acknowledged.

A somewhat related, copending application Ser. No. 649,851 entitled "Method and Apparatus for Comparing Real-Time Operation of Object Code Compatible Processor" and filed Jan. 31, 1991 discusses a method for comparing the operation of two non-identical object code compatible processors.

SUMMARY OF THE INVENTION

The present invention comprises a method and apparatus for operating tightly coupled mirrored processors in a computer system. A plurality of CPU boards are coupled to a processor/memory bus, commonly called a host bus. The host bus is in turn coupled to an I/O or expansion bus. Each CPU board includes a processor as well as distributed system peripheral (DSP) logic comprising various ports, timers, and interrupt controller logic. Common System Peripheral (CSP) logic is coupled to the expansion bus and is coupled to the DSP logic on each CPU board via a multiplexed bus (MUX bus). The CSP logic includes interrupt receive logic and operates to provide interrupt requests to the interrupt controller logic in each DSP via the MUX bus.

In one embodiment, the processor on one CPU board is designated as the master processor, with the processors on the remaining CPU boards being designated as mirroring or slave processors. In an alternate embodiment, two or more master processors are included, these forming a multiprocessor system, and one or more slave processors mirror each respective primary processor. Master processors have full access to the host bus, whereas slave processors are prevented from writing to the host bus. On read operations the respective master and slave processors obtain the necessary code or data from the host bus. On write operations, data is written by the respective master processor onto the host bus, and the respective slave processors write their data to a buffer on their respective CPU board. The slave CPUs compare the data they have generated with the data on the host bus written by the master processor. If the data is not identical, a mirror error is generated, which halts the system clock. This effectively halts the entire system, thus preserving the instruction being executed when the error occurred for detection.

When the CSP accesses a port in the DSP logic associated with the respective master processor (master DSP logic) the access is broadcast via the MUX bus to the DSP logic associated with the respective slave processors (slave DSP logic). If the access is a read access to the DSP, the master DSP logic writes the requested data onto the MUX bus to the CSP, and this data is received by the slave DSP logic. The slave DSP logic compares the data written by the master DSP logic with what it would have written. An inconsistency generates a mirror error and halts the system clock to preserve the instruction that caused the error.

Interrupt requests generated in the system and provided by the CSP to the respective DSP logic are synchronized at the input to each DSP to a clocking signal. The interrupt signals output from each respective DSP logic to the respective processors are also tightly synchronized to guarantee that each processor is interrupted at exactly the same time. Logic is also included to guarantee that the interrupt signal provided to the respective processor does not change state during either interrupt changes or write cycles to the interrupt controller.

In addition, timers in the DSP logic in each of the respective CPU boards are synchronized to guarantee that the respective DSP logic performs operations at exactly the same time. Both the timer inputs and outputs are synchronized to the host bus clocking signal. To avoid race conditions, the timers are not clocked during write cycles to the timers.

Thus, the slave processors execute the same code at the exact same time as the respective master processor transparent to software. When the output of the master processor and a respective mirroring processor differs, the system clock is halted, and a mirror error is generated.

BRIEF DESCRIPTION OF THE DRAWINGS

A better understanding of the present invention can be obtained when the following detailed description of the preferred embodiment is considered in conjunction with the following drawings, in which:

FIG. 8 is a schematic logic diagram illustrating MUX bus mirroring logic in the DSP logic of FIG. 3;

FIG. 9 illustrates comparison logic in the cache data buffer of FIG. 2;

FIG. 10 illustrates comparison logic in the cache interface logic of FIG. 2; and FIG. 11 illustrates clock disabling logic in the clock generation logic of FIG. 1.

DETAILED DESCRIPTION OF THE SPECIFIC EMBODIMENT

Figure 1:
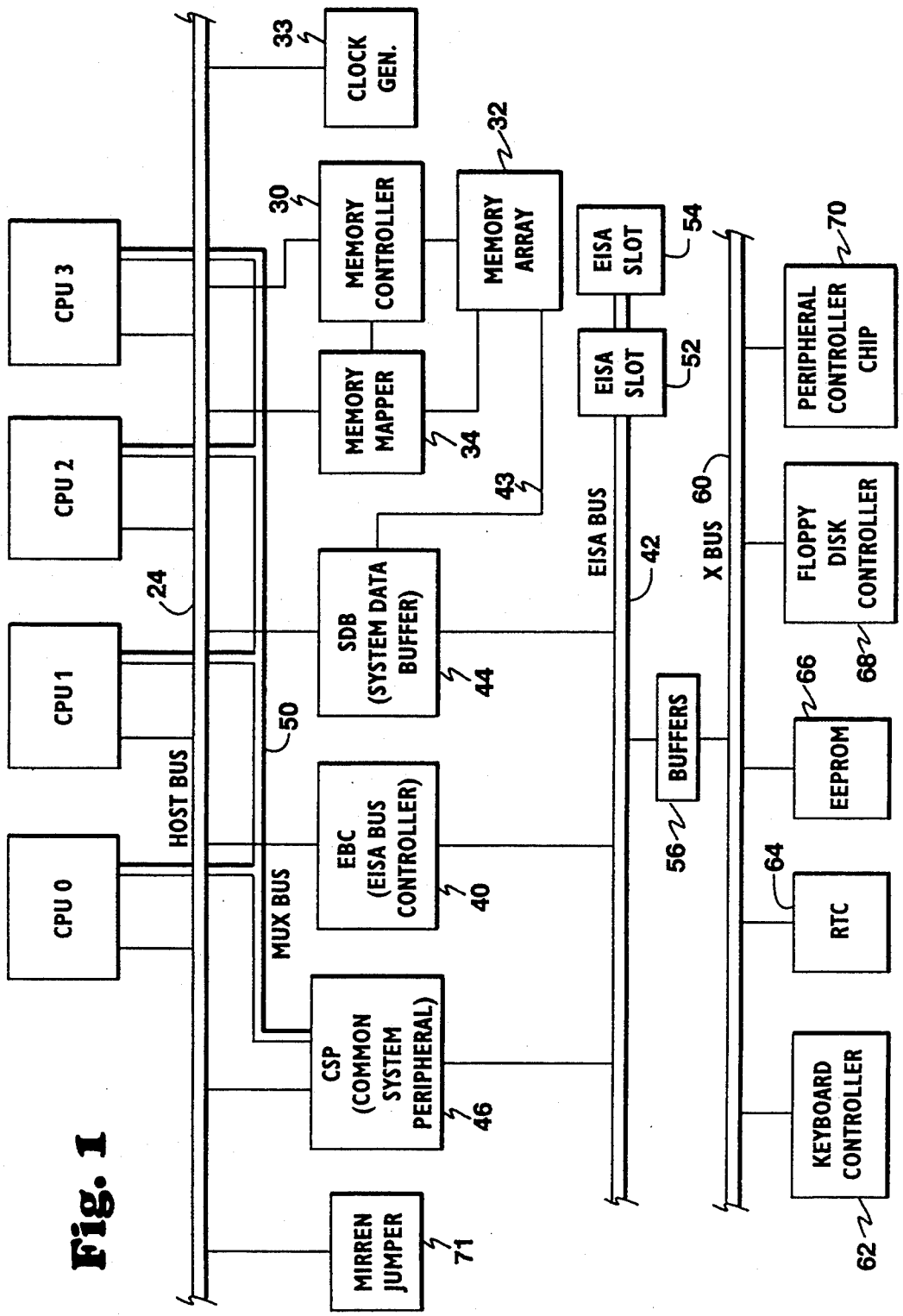
FIG. 1 is a block diagram of a computer system incorporating the present invention.

Referring now to FIG. 1, a computer system C is shown. The computer system C includes four processors in the preferred embodiment, although any number of processors may be used. The computer system elements that are not discussed in detail below are not significant to the present invention other than to illustrate an example of a fully configured computer system.

The computer system C includes four CPU boards referred to as CPU0, CPU1, CPU2, and CPU3 connected to a host bus 24. In one embodiment, CPU0 is a master CPU board including a master processor, CPU1 is a mirroring or slave board and CPU2 and CPU3 are not connected. In a second embodiment, CPU0 is a master CPU board including a master processor, and CPU1, CPU2, and CPU3 are slave boards. In a third embodiment, CPU0 and CPU2 are master boards while CPU1 and CPU3 are slave boards, where CPU1 mirrors CPU0 and CPU3 mirror CPU2. Alternatively, both CPU1 and CPU3 can mirror one of the master CPU's, for example, CPU0, with CPU2 being a master processor that is not mirrored.

A memory controller 30 is coupled to the host bus 24. A main memory array 32, preferably comprised of dynamic random access memory, (DRAM) is coupled to the memory controller. Memory mapper logic 34 is coupled to the host bus 24, the memory controller 30 and the memory array 32. The memory mapper logic 34 provides memory mapping functions to facilitate memory accesses to the memory array 32. Clock generation logic 33 is coupled to the host bus 24 and provides clocking signals for operation of the computer system.

A system data buffer (SDB) 44 is coupled between the host bus 24, the EISA bus 42, and the memory array 22 to allow data flow between the elements. The SDB 44 is coupled to the memory array 32 by a memory bus 43. A bus controller 40, preferably an EISA bus controller (EBC), is coupled between the host bus 24 and an expansion bus 42, preferably the Extended Industry Standard Architecture (EISA) bus. The EBC 40 provides various bus cycle translation and conversion functions to facilitate transfers between the host bus 24, the EISA bus 42 and the memory bus 43. A logic block referred to as the common system peripheral (CSP) 46 is coupled between the host bus 24 and the EISA bus 42. The CSP is also coupled through a MUX bus 50 to a logic block referred to as the distributed system peripheral (DSP) (FIG. 2) in each of CPU0 CPU1, CPU2, and CPU3.

The CSP 46 includes various system functions including a direct memory access (DMA) controller, EISA arbitration controller, and numerous system board logic functions such as memory refresh control, among others. The CSP 46 also includes interrupt receive logic which receives the various interrupt signals from the various peripheral and I/O devices and transmits these interrupt request signals to the DSP logic in each of CPU0, CPU1, CPU2 and CPU3 via the MUX bus 50. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTI-PROCESSOR COMPUTER SYSTEMS, filed concurrently with this application, which is hereby incorporated by reference.

Therefore, in the present system respective interrupt controller logic for each processor is located on the respective CPU board. General interrupt receive circuitry is located in the CSP logic 46 coupled between the host bus 24 and the expansion bus and operates to receive interrupts from the various peripheral or I/O devices and funnel these interrupts to each of the respective CPU boards to the respective interrupt controller logic. For more information on this system, please see co-pending application Ser. No. 07/955,683, entitled ARRANGEMENT OF DMA, INTERRUPT AND TIMER FUNCTIONS TO IMPLEMENT SYMMETRICAL PROCESSING IN A MULTI-PROCESSOR COMPUTER SYSTEM, filed concurrently herewith, which is hereby incorporated by reference.

The EISA bus 42 includes a plurality of EISA slots 52 and 54 for receiving EISA and ISA expansion cards, for example, a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, EEPROM (electrically erasable programmable read only memory) 66, a floppy disk controller 68, and a peripheral controller chip 70 which includes numerous parallel ports and UARTS (universally asynchronous receiver/transmitters).

Figure 2:
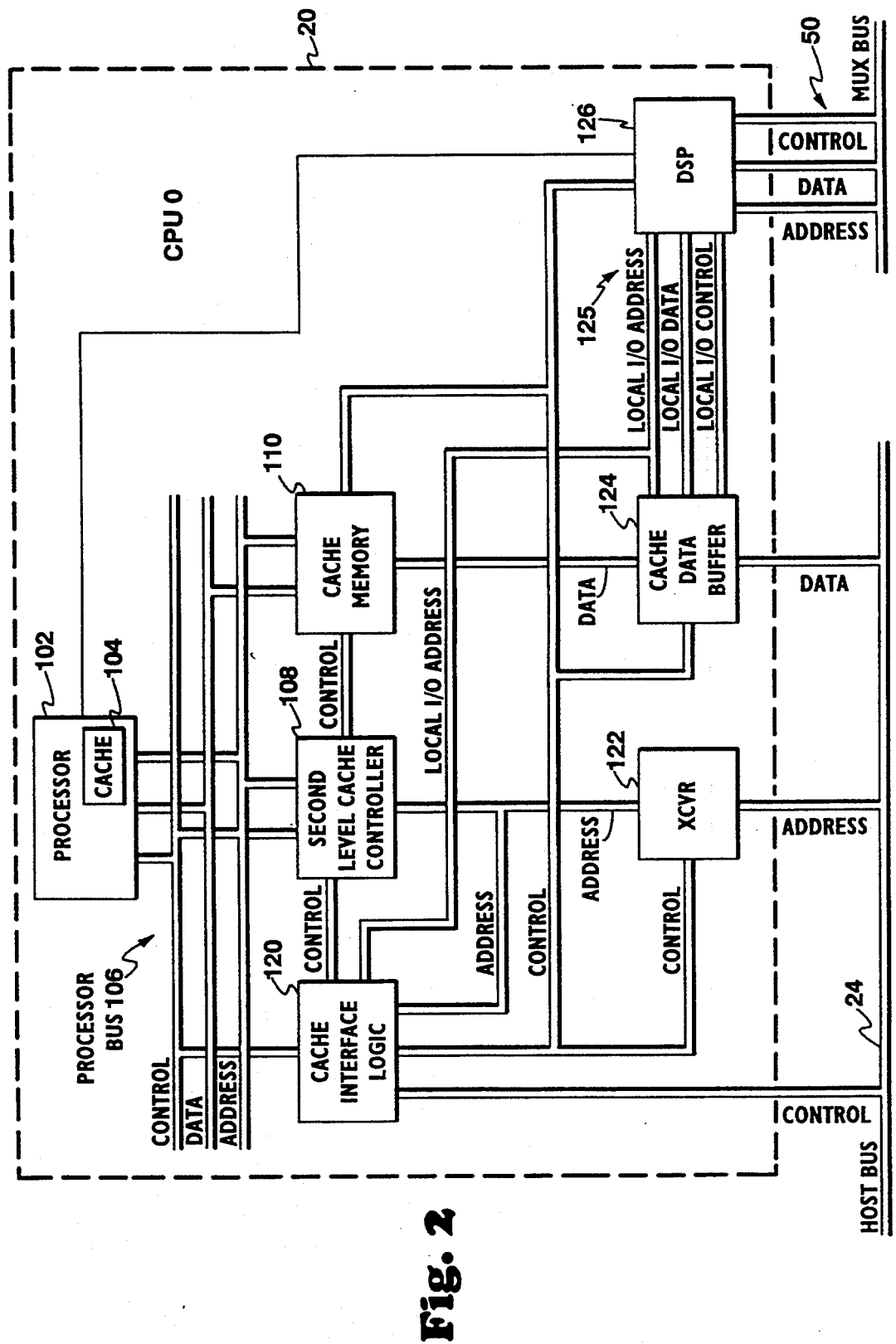
FIG. 2 illustrates a CPU board of FIG. 1.

Referring now to FIG. 2, a block diagram of a respective CPU is shown. CPU0–CPU3 operate in a similar manner, the master difference being that a mirrored CPU does not perform any writes on either of the host bus 24 or the MUX bus 50. In addition, a mirrored CPU performs a comparison with the data that it would have written with the data output from the respective master CPU being mirrored. In the following description CPU0 is described for simplicity, and the following description applies equally well to the other CPUs except as otherwise noted.

CPU0 includes a processor 102 which preferably includes an internal cache 104. The processor 102 is preferably the Intel i486 processor. However, the use of other types of processors is also contemplated. The processor 102 is connected to a processor bus 106 including control, data and address portions, as shown. A second level cache controller 108 is coupled to the control and address portions of the processor bus 106. Cache memory 110 is connected to the data and address portions of the processor bus 106. The second level cache controller 108 connects to the cache memory 110 via various control lines as shown. The second level cache controller 108 is preferably the 82495 or C5 cache controller produced by Intel. The cache memory 110 preferably comprises the 82490 or C8 RAMs produced by Intel which are normally used with the C5 cache controller. The C5 is a second level cache controller for the i486 processor that works in conjunction with the C8 status RAMs to provide a unified write-back data and instruction cache which is transparent to system software. Although this configuration is used in the preferred embodiment, other configurations may of course also be used.

Cache interface logic 120 is coupled to the second level cache controller 108 through control lines and is coupled to the control portion of the processor bus 106, as shown. The address pins of the second level cache controller 108 are connected to a transceiver 122, which in turn is connected to the host bus 24. The address pins of the second level cache controller 108 are also connected to the cache interface logic 120. The address lines coupled between the second level cache controller 108 and the transceiver 122 are bi-directional, meaning that the second level cache controller 108 can drive an address through the transceiver 122 onto the host bus 24 and can also receive an address from the host bus 24 through the transceiver 122 for snooping purposes.

The data pins of the cache memory 110 are connected to a cache data buffer 124, which in turn is connected to the host bus 24. The cache data buffer 124 is connected to the DSP 126 via a local I/O bus 125 comprising local I/O address, data and control lines, as shown. The cache interface logic 120 provides a portion of the local I/O address to the local I/O address lines coupled between the cache data buffer 124 and the DSP 126. The cache memory 110 also provides control lines to the DSP 126. The DSP 126 is connected through the MUX bus 50 to the CSP 46 (FIG. 1). The DSP logic 126 also provides control signals to the processor 102.

The cache interface logic 120 is connected to the host bus 24 via control lines and also is connected to the address transceiver 122, the cache data buffer 124 and the DSP 126 via control lines. The control lines from the cache interface logic 120 to the address transceiver 122 and the cache data buffer 124 act as output enables for both the second level cache controller 108 and the cache memory 110.

The cache interface logic 120 provides the required bus controller functions to interface the second level cache system comprising the second level cache controller 108 and cache memory 110 with the host bus 24.

The cache interface logic 120 provides necessary signal interpretation and translation functions between the second level cache controller 108 and the host bus 24. The cache interface logic 120 also controls the operation of local I/O cycles.

When a cache read or write miss occurs in the second level cache system, the second level cache controller 108 broadcasts the requested address to the cache interface logic 120 and also provides the address to the address transceiver 122. The cache interface logic 120 performs an address decode to determine if the requested address requires a host bus cycle or requires access to ports in the DSP 126. If the address requires a host bus cycle, the cache interface logic 120 enables the address transceiver 122 to present the address onto the host bus 24. The cache interface logic 120 also enables the cache data buffer 124 to present the respective data onto the host bus 24, using a host bus output enable signal referred to as HBOE. However, as discussed below, if the CPU board is a slave board, then address and data signals are not presented to the host bus 24, but rather the CPU board compares its own signals with the host bus signals generated by the respective master CPU.

If the address generated by the second level cache controller 108 is directed to a port in the DSP 126, then the cache interface logic provides a portion of the local I/O address to the DSP 126. The cache data buffer 124 provides the lower two bits of the local I/O address, these being byte enable signals. The cache interface logic 120 also provides necessary control signals to operate the local I/O cycle.

Several mirroring configurations are available to isolate errors and debug CPU boards: 1M/1S, 1M/2S, 1M/1S, and 2M/2S (nM indicates n master CPUs and nS indicates n slave CPUs). The 1M/3S configuration can isolate two failing CPUs, although two failures at the same time are unlikely unless related. The 1M/2S configuration isolates one failing CPU on the first failure. The 1M/1S configuration detects a failure, but cannot isolate the failing CPU on the first failure. For 1M/1S and 2M/2S configurations, swapping of CPU boards is required to isolate the CPU causing the error. CPU board swapping assumes that the failure is repeatable and that specific dependencies between the CPU boards and the computer system are negligible. CPU board swapping is also time-intensive and thus is not suggested for manufacturing applications.

Referring again to FIG. 1, the computer system includes a jumper 71 referred to as the MIRREN jumper connected to the host bus 24. When set, the MIRREN jumper asserts a mirror enable signal referred to as MIRREN. The MIRREN jumper must be set prior to powerup in the preferred embodiment for the CPU mirroring logic to operate properly. In the preferred embodiment, the asserted MIRREN signal enables a 2M/2S configuration where CPU0 and CPU2 are master or master CPUs and CPU1 and CPU3 are slave CPUs, respectively. Accordingly, in the preferred embodiment, CPU1 mirrors CPU0 and CPU3 mirrors CPU2. This can be done quite simply by using the MIRREN signal to change the effective physical slot identification of the slave CPUs to the slot identification of the master CPU they are mirroring. Thus, the master and slave CPUs have the same physical CPU number, and then also generally the same logical CPU number. The MIRREN signal is also provided to CPU1, CPU3, and the memory controller 30 to enable mirroring functions, as described below.

Each of the CPU boards generates a slot-specific host bus request signal HBREQ<0>, HBREQ<1>, HBREQ<2>, and HBREQ<3> to request control of the host bus 24. The memory controller 30 includes host bus arbitration logic (not shown) which receives these respective host bus request signals and generates corresponding host bus acknowledge signals HACK<x>, these being HACK<0>, HACK<1>, HACK<2>, and HACK<3>, respectively.

The asserted MIRREN signal provided to the memory controller 30 forces the host bus arbiter in the memory controller 30 to change the way it drives the HACK<x> lines. In the preferred embodiment, when mirroring is enabled, a host bus request by CPU0 is responded to with the HACK<0> signal and the HACK<1> signal, thus allowing both CPU0 and its slave CPU, CPU1, to respond. A host bus request by CPU2 is responded to with the HACK<2> and HACK<3> signals, thus allowing CPU2 and its slave CPU, CPU3, to respond. In an alternate embodiment, only two processors, CPU0 and CPU1, are included in the computer system, and CPU1 mirrors CPU0 when the MIRREN signal is asserted with the memory controller 30 driving the HACK<0> and HACK<1> signals to allow both CPUs to be active at the same time. In a 1M/3S embodiment where CPU1, CPU2 and CPU3 all mirror CPU0, the memory controller 30 drives the HACK<0>, HACK<1>, HACK<2> and HACK<3> signals to allow all CPUs to be active at the same time.

The MIRREN signal is also provided to the cache interface logic 120, the cache data buffer 124, and the DSP logic 126 on CPU1 and CPU3 and, when asserted, prevents these boards from driving outputs onto either the host bus 24 or the MUX bus 50, respectively. The asserted MIRREN signal also directs the cache data buffer 124 and the DSP logic 126 to perform a mirror comparison of data generated by the respective master CPU and the data internally generated by the respective slave CPU. If the mirror comparison determines that the data from the master CPU and slave CPU differ in any respect, then an error signal is generated. Certain control signals are also compared in the cache interface logic 120. It is noted that not all signal outputs are checked, only those that are bussed between the CPUs and can be guaranteed to meet the setup time for each clock cycle.

Each pair of CPU boards generate respective signals referred to as MIRERR to indicate that an error has occurred, i.e., non-identical data was generated by a master and slave CPU. The MIRERR signal is a 12 ma open-collector type of output to allow for external combining with MIRRER signals generated by the various logic. The MIRERR signal drives a front panel error LED and causes the system clock to freeze, preventing any further operation. In an alternate embodiment, two separate MIRERR signals are generated from CPU1 and CPU3, respectively, to separate LEDs. If the system stops due to a mirror error, then the CPU cards can be swapped around (with known good boards) to find the actual bad board.

DSP Logic

Figure 3:
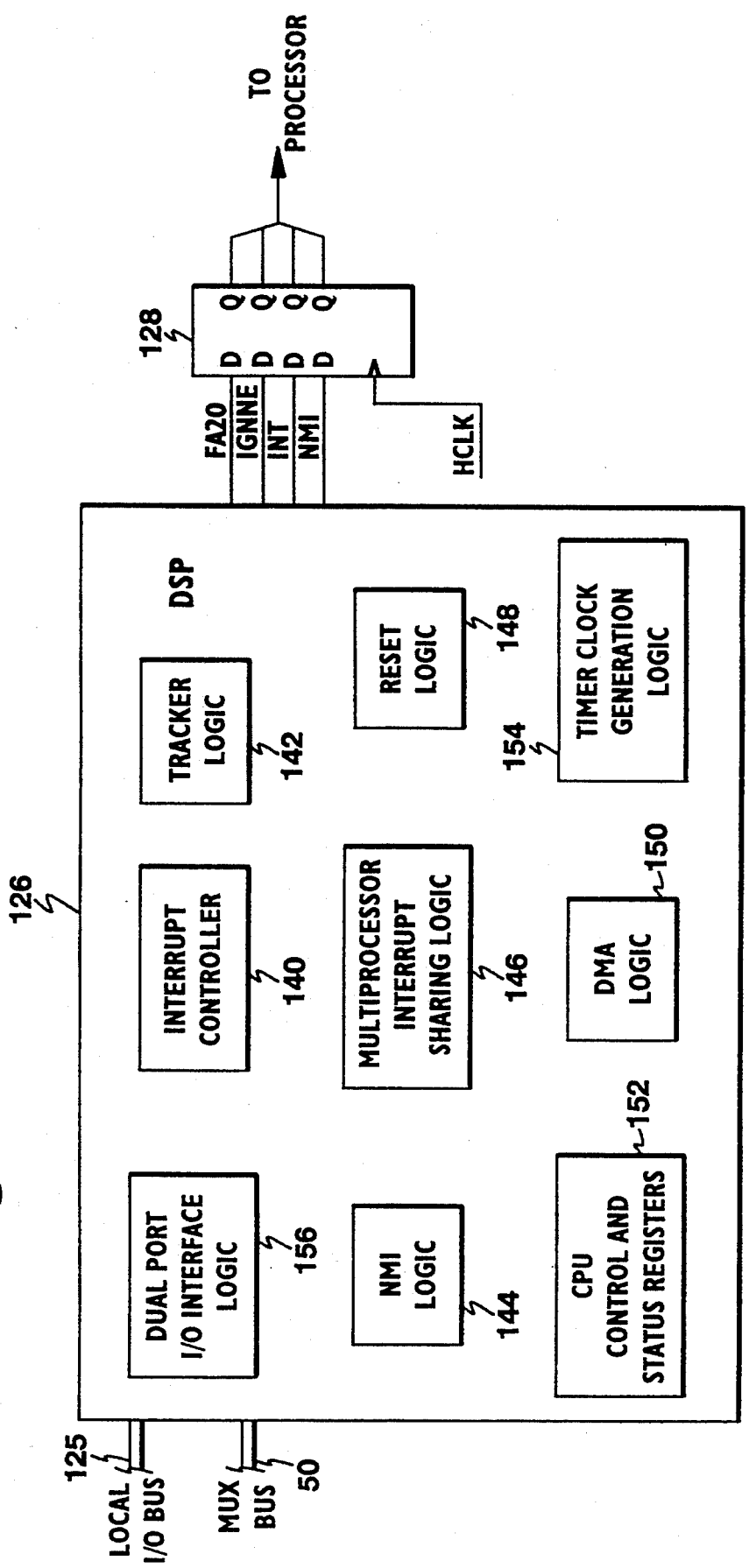
FIG. 3 is a more detailed block diagram of the distributed system peripheral (DSP) of FIG. 2.

The DSP 126 implements various logic functions that are closely related to the processor/cache subsystem. Referring now to FIG. 3, the DSP 126 includes interrupt controller logic 140, preferably comprising two cascaded Intel 8259 interrupt controllers which provide 15 levels of interrupts. The interrupt controller logic 140 also includes interrupt controller synchronization logic according to the present invention which guarantees that interrupts enter and leave the interrupt controller logic 140 at the same time for each of the DSPs 126 on each CPU board.

The DSP 126 includes timer clock generation logic 154 which includes a plurality of timers as well as timer synchronization logic according to the present invention. The DSP 126 includes 5 timers in the preferred embodiment which perform various functions, including a system timer, a refresh timer, and a CPU frequency control timer, among others. The timer synchronization logic synchronizes the timers in the timer clock generation logic 154 in each of the DSPs 126 to a common clocking signal. Each DSP 126 also includes MUX bus mirroring comparison logic (FIG. 8) according to the present invention which compares data written by a master CPU board with internally generated data and generates a mirror error signal if a disparity exists. It is noted that the MUX bus mirroring comparison logic is only enabled on CPU boards that are slave boards.

The DSP 126 also includes non-maskable interrupt (NMI) logic 144 and multiprocessor interrupt sharing logic 146. The multiprocessor interrupt sharing logic 146 allows a CPU to interrupt other CPU's at an interrupt level in one I/O access, thus providing an efficient multiprocessor communication capability. Also included are reset logic 148, DMA logic 150, various CPU control and status registers 152, and dual port I/O interface logic 156. The dual port I/O interface logic 156 interfaces the various registers in the DSP 126 with the local I/O bus 125 and the MUX bus 50.

The DSP 126 provides certain control signals to the processor 102, including an interrupt signal referred to as INT, a non-maskable signal referred to as NMI, an "ignore numeric error" signal referred to as IGNNE and a signal which forces the A20 address pin of the processor 102 high, referred to as FA20. In prior art systems, these signals are asynchronous to the processor 102. It is noted that the output delay from the HCLK signal operating at 25 MHz for these output signals is required to be 11 nsec maximum and 3 nsec minimum, and for the HCLK signal operating at 33 MHz, these outputs must be 9 nsec maximum and 2 nsec minimum to meet the processor setup requirements and clock skew. Therefore these signals are resynchronized to the HCLK signal with an external flip-flop 128. The FA20, IGNNE, INT, and NMI signals are connected to D inputs of the flip-flop 128 whose Q outputs are provided to the processor 102. The HCLK signal is connected to the clock input of the flip-flop 128. The flip-flop 128 allows the delay from the DSP logic 126 to increase to approximately 27 nsec at 33 MHz. This synchronization allows these signals to reach the respective processors at the same time to produce identical processor behavior.

DSP Timer Synchronization Logic

Figure 4:
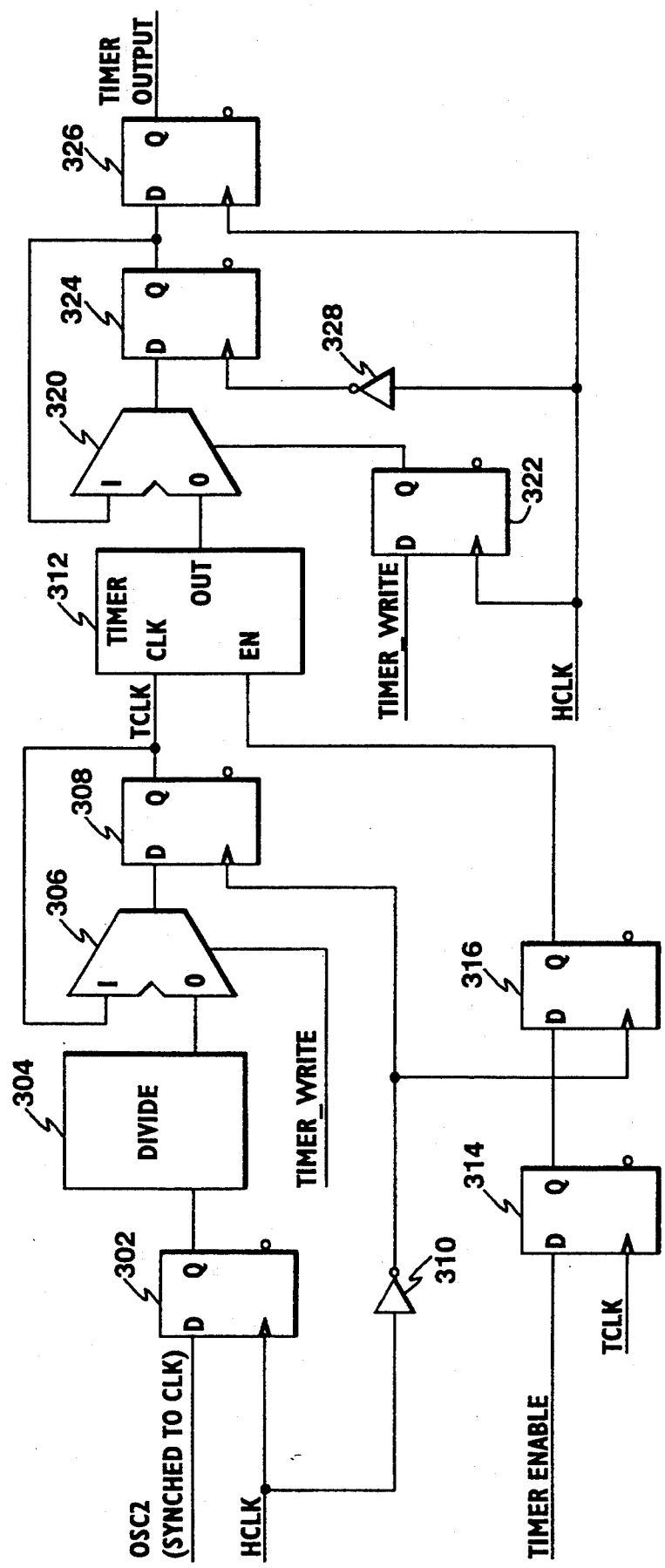
FIG. 4 is a schematic logic diagram illustrating timer synchronization logic in the DSP logic of FIG. 3.

Referring now to FIG. 4, the timer synchronization logic in the timer clock generation logic 154 is shown. A brief review of the signals used in this logic is deemed appropriate. A signal referred to as HCLK is the host bus clocking signal generated by the clock generation logic 33 having a frequency of 25 or 33 MHz. A signal referred to as OSC2 is a clocking signal generated by the clock generation logic 33 used to synchronize the timers in each of the DSPs 126 and each of the respective CPU boards. The OSC2 signal has a frequency of 7.16 MHz. In prior art systems, the synchronizing signal is operated at a frequency of 14.316 MHz. However, in the preferred embodiment the signal is divided by two to maintain a Nyquist sampling rate of ½ the frequency of the HCLK signal, which in some systems is 25 MHz. A signal referred to as TIMER_ENABLE is asserted to indicate whether the timers in the DSP 126 are enabled. A signal referred to as TIMER_WRITE indicates that the respective processor 102 is performing a write cycle to a timer in the DSP 126.

The OSC2 signal is connected to the D input of a D type flip-flop 302. The HCLK signal is connected to the clocking input of the flip-flop 302. The flip-flop 302 serves to synchronize the OSC2 signal to the positive or rising edge of the HCLK signal. The Q output of the flip-flop 302 is provided to divide circuitry 304. In the preferred embodiment, the divide circuitry 304 preferably divides the OSC2 signal by either 6 or 24, depending on the respective timer and function, producing signals of either 1.193 MHz or 0.2983 MHz respectively. The divide logic 304 includes a flip-flop (not shown) which is used to synchronize the divided OSC2 signal to the HCLK signal after the OSC2 signal has been divided by the divide logic 304 to compensate for any skew that has occurred through the divider 304.

The clocking signal output from the divide circuitry 304 is connected to one input of a 2 input multiplexor 306. The select input of the multiplexor 306 receives a signal referred to as TIMER_WRITE, which indicates whether a write is occurring to the respective timer. The output of the multiplexor is connected to the D input of a D type flip-flop 308. The HCLK signal is connected to the input of an inverter 310 whose output is connected to the clocking input of the flip-flop 308. Thus, the output of the multiplexor 306 is clocked into the flip-flop 308 on the negative or falling edge of the HCLK signal. The Q output of the flip-flop 308 is a signal referred to as TCLK. The TCLK signal is provided to the second input of the multiplexor 306 and is provided to the clock input of a timer 312.

The timer 312 includes data inputs (not shown) which are used by the processor to set the timer or to change the mode of the timer. It is undesirable to clock the timer while it is being loaded with a value or while its mode is being changed. When a timer write is occurring, the TIMER_WRITE signal is asserted and the upper input of the multiplexor 306 is selected to pass through to the flip-flop 308. In this manner, the TCLK signal is prevented from changing state during a timer write cycle.

The multiplexor 306 and flip-flop 308 are provided for timer write situations. In prior systems, the timers were clocked off of the EISA bus signal BCLK, which operates at a much slower frequency. Since the various timers are local to each of the respective processors in this system, the timers are clocked off of the host bus clocking signal HCLK. The result is that a timer write cycle is being clocked with the same clocking signal that is used to clock the timer itself. This results in a race condition where the timer potentially could be loaded and clocked at the same time. Therefore, the inverter 310 is used to clock the TCLK signal on the negative edge of HCLK, whereas a timer write cycle is clocked on the positive edge of the HCLK signal. This helps to prevent such a race condition from occurring. In addition, during a timer write cycle, the multiplexor 306 acts to prevent the TCLK signal from changing state, thus preventing the timer 312 from being clocked during a write cycle. This provides a window of time for write data to be provided to the respective timer 312 before the timer 312 is clocked.

Certain timers in the DSP 126 have an enable input which allows the processor to determine whether the timer 312 should be enabled. If the timer is not enabled, then the timer will not change state, even when it receives the TCLK signal. For these timers, a signal referred to as TIMER_ENABLE is provided to the input of a D type flip-flop 314 whose clock input receives the TCLK signal. The Q output of the flip-flop is connected to the D input of a D type flip-flop 316. The output of the inverter 310 is provided to the clock input of the flip-flop 316. The Q output of the flip-flop 316 is provided to the enable input of the timer 312. The TIMER_ENABLE signal is generated by a processor write signal which is clocked with the HCLK signal, (not shown) and thus a potential race condition may also occur with respect to the TIMER_ENABLE signal and the clocking of the timer 312. Therefore, the TIMER_ENABLE signal is initially clocked with the TCLK signal at flip-flop 314 and is clocked off the negative edge of the HCLK signal at flip-flop 316 before being provided to the timer 312. This insures that the enable logic internal to the timer 312 is not switching on TCLK edges.

The output of the timer is provided to one input of a multiplexor 320. The TIMER_WRITE signal is provided to the D input of a D type flip-flop 322 whose Q input is connected to the select input of the multiplexor 320. The HCLK signal is provided to the clock input of the flip-flop 322. The output of the multiplexor 320 is provided to the D input of a D type flip-flop 324 whose Q output is connected to the D input of a D type flip-flop 326. The HCLK signal is connected through an inverter 328 to the clock input of the flip-flop 324. The Q output of the flip-flip 324 is also provided to the second input of the multiplexor 320. The HCLK signal is provided to the clock input of the flip-flop 326. The output of the flip-flop 326 is referred to as TIMER_OUTPUT.

The multiplexor 320 and flip-flop 324 perform a function similar to the multiplexor 306 and flip-flop 308, which is to prevent the TIMER_OUTPUT signal from changing state during and for once HCLK signal cycle after a timer write cycle is in progress. The flip-flop 324 also serves to clock the output on the negative or falling edge of the HCLK signal. The output of the timer 312 is then clocked on the positive edge of the HCLK signal at flip-flop 326. Thus the timers in each DSP 126 are clocked off of a common clocking signal referred to as OSC2, which in turn is synchronized to the HCLK signal. This enables the DSP logic 126 in master and slave CPUs to perform operations at exactly the same time, i.e. the master and slave DSP logic 126 operate in lockstep. Also, logic is included to prevent race conditions from occurring during writes to the timers.

DSP Interrupt Controller Synchronization Logic

Figure 5:
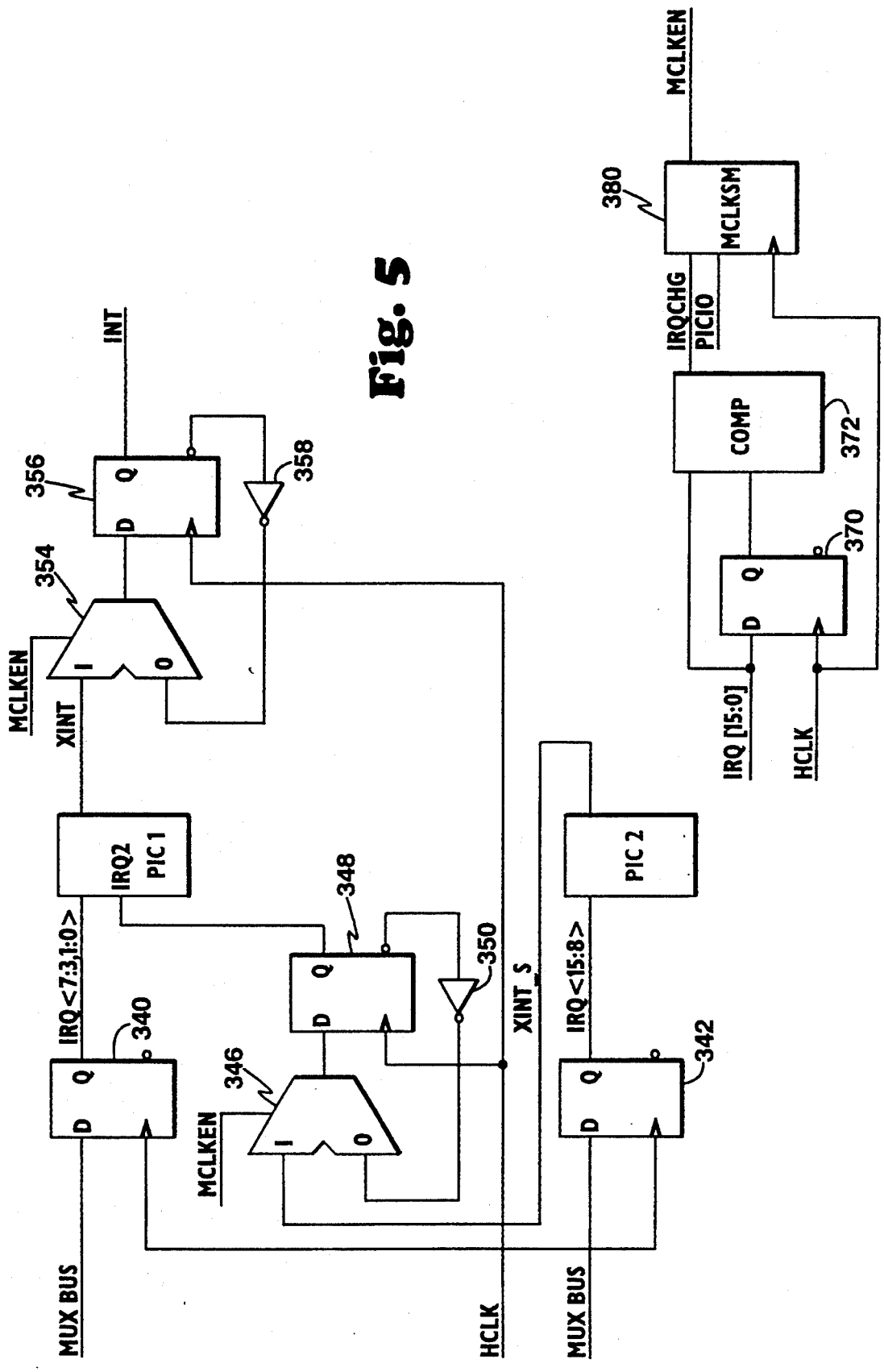
FIG. 5 is a schematic logic diagram illustrating programmable interrupt controller synchronization logic in the DSP logic of FIG. 3.

Referring now to FIG. 5, interrupt controller synchronization logic according to the present invention in the interrupt controller logic 140 is shown. The interrupt controller logic 140 includes 2 programmable interrupt controllers (PICs) referred to as PIC1 and PIC2.

The interrupt controllers PIC1 and PIC2 are each preferably the 8259 from Intel. PIC1 is referred to as the master, and PIC2 is referred to as the slave. The two PICs are cascaded together as shown.

The inputs and outputs of the interrupt controller logic 140 from the MUX bus 50 are synchronized with the HCLK signal. The interrupt request inputs are all clocked in on rising edge of the HCLK signal. The INT outputs of both controllers are clocked at least 2 HCLK signal cycles after an interrupt acknowledge cycle to the controllers. The clocking of the outputs is controlled by logic referred to as the interrupt clock mask state machine (MCLKSM). Detection of an interrupt input change is done by comparing the current clocked interrupt inputs to the previous clocked interrupt inputs. If a change is detected, the MCLKSM logic is triggered.

Signals from a portion of the MUX bus 50 are provided to D inputs of a D type flip-flop 340 whose Q outputs are provided to interrupt request inputs of PIC1. The HCLK signal is provided to the clock input of the flip-flop 340. The interrupt request signals that are provided to PIC1 are the IRQ[7:3,1:0] signals, as shown. A portion of the MUX bus 50 is also provided to D inputs of a D type flip-flop 342 whose Q output is connected to the interrupt input of PIC1. The HCLK signal is provided to the clock input of the flip-flop 342. The interrupt request signals provided to PIC2 are the IRQ[15:8] signals. The output of PIC2 is referred to as XINT-S. In prior art systems, the output of PIC2 would be provided directly to the IRQ2 input of PIC1. However, according to the present invention, synchronizing logic is provided between the XINT_S output signal of PIC2 and the IRQ2 input of PIC1.

The XINT_S signal is provided to an input of a two input multiplexor 346. A signal referred to as MCLKEN is provided to the select input of the multiplexor 346. The output of the multiplexor 346 is provided to the D input of a D type flip-flop 348 whose Q output is connected to the IRQ2 input of PIC1. The HCLK signal is provided to the clock input of the flip-flop 348. The inverted Q output of the flip-flop 348 is provided through an inverter 350 to the second input of a multiplexor 346.

The MCLKEN signal is generated by control logic 370 referred to as the interrupt clock master state machine or the MCLKSM logic. When the MCLKEN signal is high or true, the multiplexor selects the upper path from PIC2 as an output of the multiplexor 346. When the MCLKEN signal is negated or false, the multiplexor 346 selects the lower path, and thus the output of the multiplexor 348 does not change state during this time. The MCLKEN signal is provided to delay the XINT_S signal from PIC1 to PIC2 in the interrupt controller logic in each of the DSPs 126 so that, if one DSP 126 happened to be faster than others, the interrupt request would still hit the IRQ2 input of each respective PIC1 at the same time.

The generation of the MCLKEN signal and the operation of the multiplexor 346 is discussed further below. The output of PIC1 is an interrupt signal referred to as XINT. The XINT signal is provided to 1 input of a 2 input multiplexor 354. The output of the multiplexor 354 is provided to the D input of a D type flip-flop 356. The clock input of the flip-flop 356 receives the HCLK signal. The Q output of the flip-flop generates an interrupt signal referred to as INT. The INT signal is provided as the interrupt signal provided to the processor 102. The flip-flop 356 operates to synchronize the interrupts from the interrupt controller logic 140 in each of the DSP's 126 to the HCLK signal, thus guaranteeing that the interrupt reaches the processors at exactly the same time regardless of any differences in the speed of operation between any of the interrupt controller logic 140 or other logic in the respective DSP's. The inverted Q output of the flip-flop 356 is provided through an inverter 358 to the second input of the multiplexor 354. The MCLKEN signal is provided to the select input of the multiplexor 354. The MCLKEN signal provides a certain amount of delay to the interrupt output of the interrupt controller logic in two situations, these situations being an interrupt request signal change or an interrupt controller I/O write cycle by the processor. In each of these instances, the MCLKEN signal provides a certain amount of delay to compensate for any speed differences between the interrupt controller logic.

The interrupt clock mask state machine logic operates as follows. The IRQ<15:0> signals are provided to D inputs of a D-type flip-flop 370 whose Q outputs are connected to first inputs of a comparator 372. The clock input of the flip-flop receives the HCLK signal. The IRQ<15:0> signals are also provided directly to second inputs of the comparator 372. The comparator 372 compares the IRQ<15:0> signals and a 1 HCLK signal cycle delayed version of the IRQ<15:0> signals and determines when an interrupt change has occurred, generating a signal referred to as IRQCHG when an interrupt change has occurred. The IRQCHG signal is provided to MCLKSM logic 380. A signal referred to as PICIO, which indicates when a programmable interrupt controller I/O cycle from the processor is occurring is also provided to the MCLKSM logic 380. The HCLK signal is provided to the clock input of the MCLKSM logic 380. The MCLKSM logic 380 outputs the MCLKEN signal.

Figure 6:
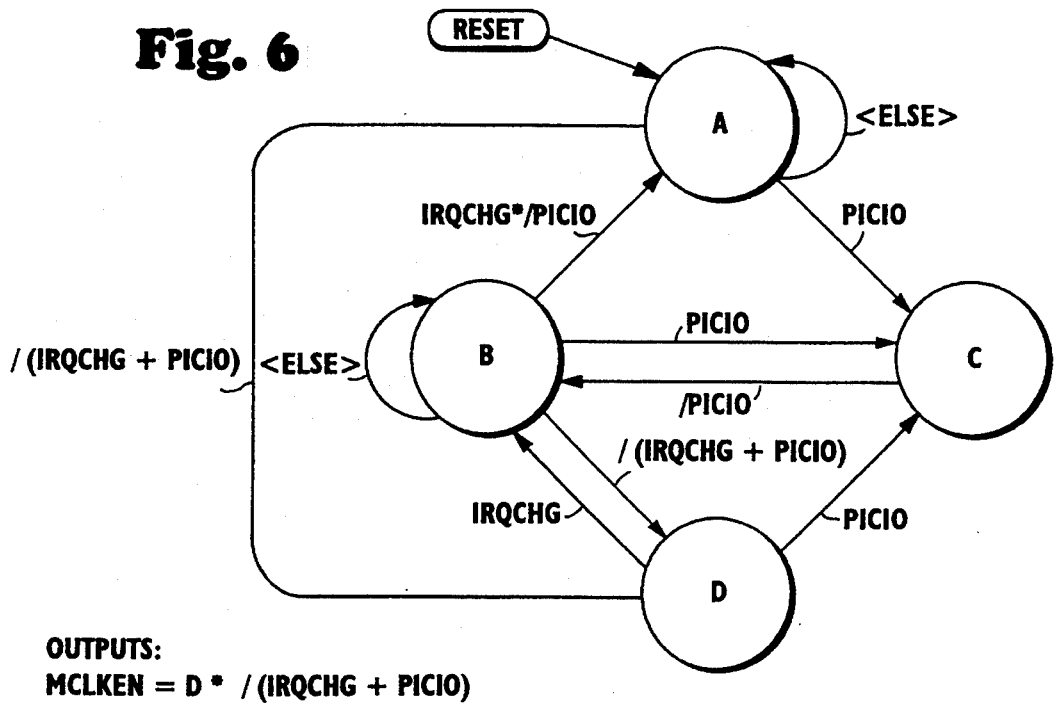
FIG. 6 is a state transition diagram illustrating operations of the MCLKSM state machine of FIG. 5.

Referring now to FIG. 6, a state transition diagram illustrating operation of the MCLKSM logic is shown. In this diagram, a slash preceding a signal name indicates that the signal is negated. As previously mentioned, the MCLKSM logic generates the MCLKEN signal. The equation for the MCLKEN signal is as follows:

$$MCLKEN = STATE\ D \cdot /(IRQCHG + PICIO)$$

Thus, the MCLKEN signal is asserted in state D when both the IRQCHG and PICIO signals are negated. The state machine includes four states referred to as A, B, C and D. The state machine begins in state A, and all states lead to this state upon a system reset. The state machine advances from state A to state C when an interrupt controller I/O write cycle is generated by the processor to the interrupt controller, signified by the PICIO signal being asserted. The state machine advances from state C to state B when the PICIO signal is negated.

The state machine advances from state A to state B when the equation $$IRQCHG \cdot /PICIO$$

is true, i.e. when an interrupt signal change is occurring and an interrupt controller I/O write cycle is not occurring. If the PICIO signal is asserted in state B, the state machine advances from state B to state C. The state machine advances from state B to state D when both the IRQCHG and PICIO signals are negated. In state D, the MCLKEN signal is true or asserted if the IRQCHG and PICIO signals are both negated. Thus, in states A, B and C, the MCLKEN signal is negated and the interrupt signal INT provided as an output of the interrupt controller logic I/O is not allowed to change state during this time. In addition, the XINT_S signal output from PIC2 to PIC1 is also not allowed to change state at the input of PIC1 during this time. When the state machine reaches state D and both the IRQCHG and PICIO signals are negated, then the MCLKEN signal is asserted or true to allow the respective interrupt controller signals to change state at the input of PIC1 and at the output of the interrupt controller logic 140.

The state machine returns from state D to state C if the PICIO signal is asserted. The state machine returns from state D to state B if the IRQCHG signal is asserted. The state machine returns from state D to state A if both the IRQCHG and PICIO signals are negated. The state machine only remains in state D for 1 HCLK signal cycle. The state machine may reach state D after an IRQ change or a plurality of IRQ changes or after one or more PICIO cycles. The INT signal output from the interrupt controller logic 140 is only allowed to change state when an IRQ change is not occurring and an interrupt controller write cycle is not occurring, after either has occurred.

Figure 7:
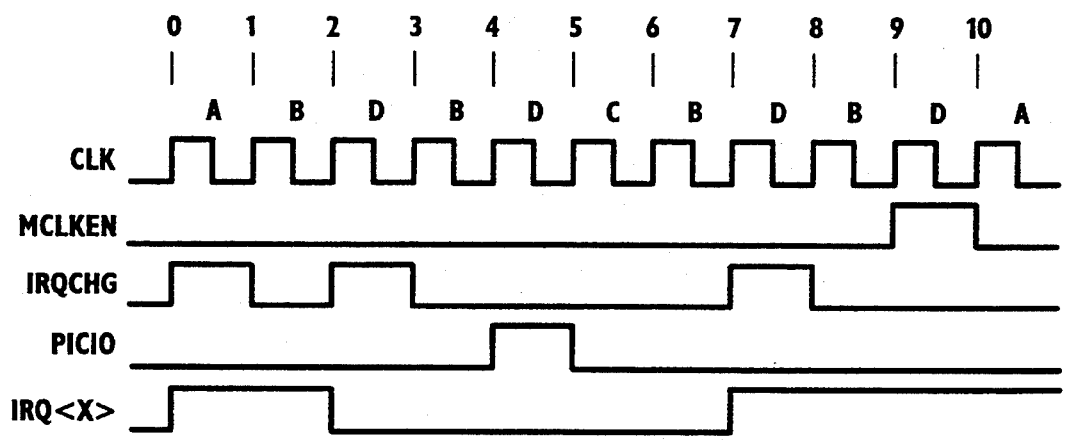
FIG. 7 is a timing diagram illustrating operation of the MCLKSM state machine of FIG. 5.

Referring now to FIG. 7, a timing diagram illustrating operation of the MCLKSM state machine is shown. Beginning at time 0, the state machine is in state A. At time 0, an IRQ signal is asserted, and thus the IRQCHG signal is also asserted at time 0. The PICIO signal is negated at time 0. At time 1, the state machine transitions from state A to state B due to the asserted IRQCHG signal and the negated PICIO signal. At time 1, the IRQCHG signal is negated. At time 2, the state machine transitions from state B to state D due to both the IRQCHG and PICIO signals being negated. At time 2, the respective IRQ signal is negated, and the IRQCHG signal is asserted at time 2. Thus, the MCLKEN signal is not asserted in state D at time 2. At time 3, the state machine returns from state D to state B due to the IRQCHG signal being asserted in state D. Also at time 3, the IRQCHG signal is negated. At time 4, the state machine returns from state B to state D due to both the IRQCHG and PICIO signals being negated. However, at time 4, the PICIO signal is asserted, indicating an interrupt controller write cycle, and thus the MCLKEN signal is again not asserted in state D. At time 5, the state machine returns from state D to state C due to the PICIO signal being asserted. At time 6, the state machine changes from state C to state B due to the PICIO signal being negated. At time 7, and an IRQ signal is asserted causing the IRQCHG signal to also be asserted and the state machine advances from state B to state D. Thus, the MCLKEN signal is again not asserted in state D due to the IRACHG signal being asserted. At time 8, the state machine returns from state D to state B due to the asserted IRQCHG signal. The state machine advances from state B to state D at time 9. Here in state D, both the IRQCHG and PICIO signals are negated, and thus, the MCLKEN signal is finally asserted to allow the INT signal to be output from the interrupt controller logic 140 to change state based on the XINT signal. In addition, the XINT_S signal output from PIC2 and provided to the multiplexer 346 is also allowed to change state as provided to the IRQ2 input of PIC1. Thus, when the MCLKEN signal is next asserted, the signal provided to the IRQ2 input of PIC1 will be allowed to change states as the INT signal output from the interrupt controller logic 140. At time 10, the state machine returns from state D to state A due to both the IRQCHG and PICIO signals being negated.

Therefore, the state machine monitors various IRQ changes and PICIO write cycles and only allows the INT signal output from the interrupt controller logic 140 and provided to the processor to change state when neither of these types of cycles are occurring, after one of the cycle types has occurred.

DSP Compare Logic

The DSP logic 126 in a respective CPU can be accessed by its respective processor through the local bus 125 and can also be accessed over the MUX bus 50 by the CSP 46. The CSP 46 accesses the DSP logic 126 in either of two ways. First, the CSP 46 broadcasts a cycle over the MUX bus 50 to all of the DSPs 126 in the system. On an interrupt request transfer each of the DSPs 126 would receive the interrupt request and load it into the PIC0 or PIC1 as described above. On broadcast writes, which are similar to interrupt request broadcasts, each DSP 126 stores the write data. In the second type of MUX bus cycle, a register in each CPU referred to as the logical CPU (LC) register is loaded with the logical address of a respective CPU to be accessed in a broadcast write cycle before the specific DSP write or read cycle begins. This logical CPU address is transmitted to each DSP logic 126 prior to the beginning of the MUX bus cycle so that only the DSP 126 in the respective CPU being accessed acknowledges the cycle. An example of this type of cycle is when a CPU is accessing another CPU's ports in the other CPU's DSP logic 126. On the next write or read cycle to a CPU specific register in the DSPs 126, only the DSP 126 of the CPU which matches the logical CPU address responds, either by storing the data or providing the data.

As previously mentioned, the MIRREN jumper must be set prior to power up of the system. This causes the master and slave CPUs to receive the same physical slot identification, which then is converted to the same logical CPU address during the POST process. Thus CPU0 and CPU1 are assigned the same logical address and CPU2 and CPU3 are assigned the same logical address so that for cycles over the MUX bus to each DSP 126, both the respective master being accessed and its corresponding slave respond. Likewise, the interrupt controller logic 140 in each of the master and slave DSP 126 are configured identically so that each responds to the same interrupt request signals. In an alternate embodiment, if either a 1M/1S, or 1M/3S configuration is implemented, then all of the CPUs are configured with the same logical CPU address. Thus the DSP 126 of the slave CPU is storing data provided over the MUX bus 50 in write cycles on the same operations as the DSP 126 of the master CPU.

However, when the CPU mirror enable signal MIRREN is asserted, a slave DSP 126 does not drive the MUX bus 50 on MUX bus 50 read cycles. Instead the slave DSP 126 samples the inputs of bi-directional ports connected to the MUX bus 50 on the rising edge of the HCLK signal during the time when write data from the DSP 126 of the master CPU is valid on the MUX bus 50. The sampled inputs are then compared to the output data from the slave DSP 126 that was not driven onto the MUX bus 50. If the data does not compare, the CPU mirror error output signal MIRERR is asserted, indicating a mis-compare has occurred in the DSP 126. The CPU error indication remains until the next system RESET, at which time it is cleared. The MIRERR signal is also be asserted for CPU parity errors and cache parity errors. These errors are not latched, and thus when the error is cleared via the NMI logic, the MIRERR signal output is negated for them.

Referring now to FIG. 8, the MUX bus comparison logic in each respective DSP 126 is shown. The MUX bus 50 includes signals referred to as XAD<7:0> and XBP<1:0>, with the XAD<7:0> signals being multiplexed address and data signals for transferring DSP register addresses and data and the XBP<1:0> signals being byte pointer signals used by the DMA controller in the CSP 46. For more information on these signals, please see patent application Ser. No. 07/955,482, previously referenced. In FIG. 8, signals referred to as XADI and XBPI are the respective signals provided as inputs to the MUX bus mirroring logic from a master CPU board. The signals XADO and XBPO are the corresponding output signals that would be generated by the respective slave CPU board except that the respective CPU board is in mirroring mode, and thus is not allowed to generate signals out onto the MUX bus 50. The XADI and XADO signals are connected to D inputs of D-type flip-flops 402 and 404, respectively. The Q outputs of the flip-flops 402 and 404 are provided to inputs of comparator logic 406. The XBPI signals and XBPO signals are provided to D inputs of D-type flip-flops 412 and 414, respectively. The Q outputs of the flip-flops 412 and 414 are provided to inputs of comparator logic 416. The HCLK signal is provided to the clock input of each of the flip-flops 402, 404, 412 and 414. Likewise, the system reset signal is provided to the reset input of each of the flip-flops 402, 404, 412 and 414.

The outputs of the comparator logic 406 and 416 are provided to inputs of a two input OR gate 420 whose output is connected to an input of a two input AND gate 422. The outputs of the comparator logic 406 and 416 are asserted high only when the two inputs are not equal, i.e., when a mis-compare has occurred. The mirroring enable signal MIRREN is provided to the other input of the AND gate 422. The output of the AND gate 422 is provided to an input of a two input OR gate 424. The output of the OR gate 424 is provided to the D input of a D-type flip-flop 426 whose output is the mirror error signal MIRERR. The MIRERR signal is provided to the second input of the OR gate 424. The clock input of the flip-flop 426 receives the HCLK signal and the reset input receives the system reset signal. Therefore, when a mirror error occurs, the MIRERR signal is asserted and remains asserted until a system reset. The MIRERR signal is also driven to the host bus 29 by a buffer having a 12 ma open-collector type of output to allow for external combining with MIRRER signals generated by the DSP 126 and cache interface logic 120.

Thus, each of the MUX bus signals from the slave DSP and the MUX bus signals output from the master DSP are synchronized with the HCLK signal and provided to respective comparators 406 and 416. These signals are ORed with the OR gate 420 and then provided to the AND gate 422. The AND gate 422 only allows an output if mirroring is enabled, and thus prevents the MIRERR signal from being asserted if mirroring is not enabled. The OR gate 424 and flip-flop 426 guarantee that once the MIRERR signal is asserted, the MIRERR signal remains asserted until a system reset occurs.

Cache Data Buffer

The cache data buffer 124 on a CPU in mirroring mode receives the asserted MIRREN signal when the MIRREN jumper is set. In the preferred embodiment, the asserted MIRREN signal is provided to CPU1 and CPU3. The asserted MIRREN signal directs the cache data buffer 124 to disable its host data buffers, thus preventing any data from being presented onto the host bus 24.

The cache data buffer 124 includes data compare logic which is used when the respective CPU where a cache data buffer 124 is located is being operated as a slave CPU. Referring now to FIG. 9, cache data buffer comparison logic according to the present invention, is shown. The HD<63:0> signals from the host data bus are provided to D inputs of a 64 bit D type flip-flop 440 whose Q outputs are provided to first inputs of a comparator 444. The CD<63:0> signals from the slave CPU's cache memory 110 are provided to D inputs of a 64 bit D type flip-flop 442 whos Q outputs are provided to second inputs of the comparator 444.

The output of the comparator 444 is provided to an input of a three input AND gate 450. The output of the comparator 444 is asserted high only when the two inputs are not equal. If equal, the output is negated low. The other two inputs to the AND gate 450 are the MIRREN signal and the HBOE signal from the cache interface logic 120, which indicates that the cycle is active on the host bus, so that the HD<63:0> signals are valid for the comparison. The output of the AND gate 450 is provided to an input of a two input OR gate 452 whose output is connected to the D input of a D type flip-flop 454. The clock input of the flip-flop 454 receives the HCLK signal and the reset input receives the system reset signal. The output of the flip-flop 454 is the mirror error signal MIRERR. The MIRERR signal is provided to the second input of the OR gate 452. Therefore, when a mirror error occurs, the MIRERR signal is asserted and remains asserted until a system reset. As previously mentioned, the MIRERR signal is also driven to the host bus 24 by a buffer having a 12 ma open-collector type of output to allow for external combining with MIRRER signals generated by the DSP 126 and cache interface logic 120.

The compare logic compares the host data signals HD<63:0> generated by the respective master CPU, with the cache data signals CD<63:0>, which is the data that would be driven by the respective slave CPU if mirroring was not enabled, and drives the MIRERR signal when a mis-compare occurs. The HD<63:0> signals and the CD<63:0> signals are synchronized with the HCLK signal and provided to the comparator 444. The comparison output is latched on the rising edge of the HCLK signal and driven onto the MIRERR signal when the HBOE signal is asserted and mirroring is enabled. The OR gate 452 and flip-flop 454 guarantee that once the MIRERR signal is asserted, the MIRERR signal remains asserted until a system reset occurs.

Cache Interface Logic

When CPU1 and CPU3 are in mirroring mode, the respective cache interface logic 120 does not generate any outputs to the host bus 24. The cache interface logic 120 does not generate output enables to the XCVR 122 to prevent address signals from presented onto the host bus 24. Also, the cache interface logic 120 does not assert any control signals onto the host bus 24. The data output enable signal HBOE is driven inactive by the cache interface logic 120 to the cache data buffer 124 when the respective CPU is in mirroring mode.

The cache interface logic 120 compares certain host bus control signals generated by the master CPU with its own control signals. This allows comparison of signals during host bus read cycles and also complements the host bus write data comparison performed by the cache data buffer 124. The cache interface logic 120 preferably compares the host bus signals HWORD, HW/R, HADS, HA3, HA4, HBE<7:0>, HM/IO, HOWN, HNOSNP, HLOCK, HBOFF, HBLAST and HBUSY signals generated by the master CPU with the respective signals generated internally in the cache interface logic 120. Since all of these signals are valid on each clock while they are driven, the comparisons can occur whenever the signals are driven out. The host bus request signal HBREQ is preferably disabled but not compared when mirroring is enabled.

A brief review of the signals that are compared in the cache interface logic 120 is deemed appropriate. The HWORD signal is asserted by the cache interface logic 120 during host bus transfers that are known to involve 128 bits or more. The cache interface logic 120 asserts the signal for cache write-back cycles as these cycles comprise the cache memory writing back a full line of data to the memory write 32 which includes more than 128 bits of data. The HWORD signal is also asserted for code pre-fetches.

The HW/R signal is a host bus signal which is asserted high during write cycles and negated low during read cycles. The HADS signal is a host bus address strobe signal which indicates at the start of a host bus access.

The HBE<0..7> signals are host bus byte enable signals that indicate which of the 8 bytes of the current host bus transfer are valid. The HM/IO signal is a host bus signal indicating whether the cycle is a memory cycle or an input/output cycle. The HOWN signal indicates a caching master on read cycles and the desire to do a write-to-own cycle on write cycles. The HNOSNP signal is asserted when a bus cycle is known not to need to be snooped. The HLOCK signal is asserted to indicate that the current bus master will not give up control of the host bus 24 to another bus master. The HBOFF signal is a host bus "back-off" signal which directs the current cycle on the host bus 24 to terminate before completion. The cache interface logic 120 asserts the HBOFF signal if the cache memory 110 indicates that a snoop hit to a dirty line in the cache memory 110 has occurred, thus requiring that the cache line be written out before the current read can finish. The HBLAST signal is asserted to indicate that the current transfer is the last transfer of a burst sequence. The HBUSY signal is asserted by a new host bus master one HCLK signal cycle after gaining control of the host bus. While the HBUSY signal is asserted, arbitration is reevaluated every HCLK signal cycle and the proposed new host bus master will have its HACK signal asserted.

A cache interface logic internal signal referred to as HBUS_OE is a host bus output enable signal generated by the cache interface logic 120 that is used to enable the signals HWORD, HW/R, HADS, HBE<0..7>, HA3, HA4, HMIO, HOWN, HNOSNP, and HLOCK onto the host bus 24. A cache interface logic internal signal referred to as HBOFF_OE is an output enable signal generated by the cache interface logic 120 that is used to enable the HBOFF signal onto the host bus 24. A cache interface logic internal signal referred to a HBLAST_OE is an output enable signal generated by the cache interface logic 120 that is used to enable the HBLAST signal onto the host bus 24. A cache interface logic internal signal referred to as HBUSY_OE is used to enable the HBUSY signal from the respective CPU onto the host bus 24.

The HWORD, HW/R, HADS, HA3, HA4, <HBE0..7>, HM/IO, HOWN, HNOSNP, HBOFF, HBLAST, and HBUSY signals from each of the host bus 24 generated by the respective master CPU and those internal to the respective slave CPU are provided to a comparator 502 as shown. In addition, the output enable signals HBUS_OE, HBOFF_OE, HBLAST_OE, and HBUSY_OE, are also provided to the comparator 402. The HBOFF_OE signal, HBLAST_OE signal and HBUSY_OE signal are provided such that the HBOFF signal, the HBLAST signal and the HBUSY signals are compared when the respective output enable signals are asserted. Thus these signals are compared when the respective signal generated by the slave CPU would otherwise be enabled onto the host bus 24. The remaining signals are compared when the HBUS_OE signal is asserted, i.e., when these signals would otherwise be enabled onto the host bus 24.

The output of this comparator 502 is provided to an input of a two input AND gate 512. The output of the comparator 502 is asserted high when one or more signals from the host bus 24 and the slave CPU are not equal. If all of the signals are equal, the output is negated low. The MIRREN signal is provided through an inverter 510 to the other input of the AND gate 512. The output of the AND gate 512 is connected to an input of a two input NOR gate 514. A signal referred to as BIST_ERR is connected to an input of a two input OR gate 516 whose output is connected to the other input of the NOR gate 514. The output of the NOR gate 514 is provided to the D input of a D type flip-flop 520. The system reset signal RESET is connected to the inverted reset input of the flip-flop 520. The inverted preset input of the flip-flop 520 is tied to a logic high value. The HCLK signal is connected to the clocking input of the flip-flop 520. The output of the flip-flop 520 is the MIRERR signal. The inverted Q output of the flip-flop 520 is connected to the second input of the OR gate 516. The MIRERR signal is also driven to the host bus 24 by a buffer having a 12 ma open-collector type of output to allow for external combining with MIRRER signals generated by the DSP 126 and cache interface logic 120.

The BIST_ERR signal is a "built-in self-test" error signal which is asserted high to indicate an error during powerup operations of the CPU, cache controller 108, and cache memory 110. In the preferred embodiment, the MIRERR signal performs two duties. The MIRERR signal indicates an error during powerup operation and also indicates a mirror error. Thus, the OR gate 422 is used to allow the generation of the MIRERR signal during powerup operation when an error occurs, so that LEDs (not shown) can be activated to indicate the failure.

The comparator 502 compares the host bus version of the respective signal generated by the master CPU with the internally generated version generated by the slave CPU and provides this to the AND gate 512. The mirror enable signal MIRREN is provided to the other input of the AND gate 512 to only allow comparisons when mirroring is enabled. Once the MIRERR signal is asserted, the AND gate 422 maintains the MIRERR signal asserted until a system reset occurs.

Referring now to FIG. 11, clock disable logic in the clock generation logic 33 of FIG. 1 is shown. The MIRERR signal is connected through a resistor 540 to one input of a two input NAND gate 542. The MIRREN signal is connected to the other input of the NAND gate 542. The output of the NAND gate is connected to an enable input of the clock generation logic 33. The output of the clock generation logic is the HCLK signal as well as numerous other clocking signals (not shown) that are used in the computer system. Thus when a mirror error occurs and the MIRERR signal is asserted, the clock generation logic 33 is disabled, preventing further operation of the computer system. The MIRERR signal is also provided to illuminate an LED (light emitting diode) to warn an operator of the miscompare. In one embodiment, a separate LED is included for each master CPU.

Therefore, a method and apparatus for operating tightly coupled mirrored processor is disclosed. One or more slave CPUs mirror each respective master CPU, executing the same instructions at the same time. Only the master CPU is allowed to present write data and control signals onto either the host bus 24 or MUX bus 50. When a write operation occurs, the slave processors compare write data and various control signals with that generated by its respective master processor for disparities. The system includes interrupt controller synchronization logic to synchronize interrupt requests as well as timer synchronization logic to synchronize the timers in each of the master and slave CPUs to guarantee that the master and slave CPUs operate in lockstep.

The foregoing disclosure and description of the invention are illustrative and explanatory thereof, and various changes in the size, shape, materials, components, and circuit elements, as well as in the details of the illustrated circuitry and construction and method of operation may be made without departing from the spirit of the invention.

We claim:

1. A computer system which includes tightly coupled mirrored CPUs for design debug and testing purposes, comprising:
   a host bus having address, data and control portions;
   clock signal generating means which generates a clocking signal used by said computer system;
   memory coupled to said host bus for storing instructions and data that can be presented onto said host bus;
   a master CPU coupled to said host bus which reads instructions and data from said memory using said host bus, executes instructions, writes data to said memory using said host bus and presents control signals onto said host bus during read and write operations;
   a slave CPU coupled to said host bus which identically mirrors said data and instruction reads of said master CPU and identically mirrors instruction execution of said master CPU, wherein when said master CPU writes data onto said host bus, said slave CPU also generates write data, and wherein said slave CPU generates control signals during read and write cycles when said master CPU presents said control signals onto said host bus, said slave CPU including:
   write data comparison means which receives write data presented by said master CPU onto said host bus and also receives said slave CPU write data for comparing said master CPU write data with said slave CPU write data and for generating a mirror error signal indicative thereof;
   control signal comparison means which receives said control signals presented by said master CPU onto said host bus and also receives said control signals generated by said slave CPU for comparing said master CPU control signals with said slave CPU control signals and for generating said mirror error signal; and
   clock disabling means coupled to said write data comparison means and to said control signal comparison means for disabling said clock signal generating means when said mirror error signal indicates that said master CPU write data does not equal said slave CPU write data and when said mirror error signal indicates that said master CPU control signals are not the same as said slave CPU control signals.

2. A computer system which includes tightly coupled mirrored CPUs for design debug and testing purposes, comprising:
   a host bus having address, data and control portions;
   clock signal generating means which generates a clocking signal used by said computer system;
   memory coupled to said host bus for storing instructions and data that can be presented onto said host bus;
   a master CPU coupled to said host bus which reads instructions and data from said memory using said host bus, executes instructions, and writes data to said memory using said host bus;
   a slave CPU coupled to said host bus which identically mirrors said data and instruction reads of said master CPU and identically mirrors instruction execution of said master CPU, wherein when said master CPU writes data onto said host bus, said slave CPU also generates write data, said slave CPU including:
   write data comparison means which receives write data presented by said master CPU onto said host bus and also receives said slave CPU write data for comparing said master CPU write data with said slave CPU write data and for generating a mirror error signal indicative thereof; and
   clock disabling means coupled to said write data comparison means for disabling said clock signal generating means when said master CPU write data does not equal said slave CPU write data, and wherein each of said master and slave CPUs further includes:
   a processor; and
   distributed system peripheral (DSP) logic including processor ports and interrupt controller logic;
   wherein said DSP logic in said master CPU is referred to as the master DSP and said DSP logic in said slave CPU is referred to as the slave DSP, the computer system further including:
   an expansion bus coupled to said host bus;
   common system peripheral (CSP) logic coupled to said host bus; and
   a third bus coupled between said CSP logic and each of said DSP logic, wherein said CSP logic broadcasts read and write operations to each of said DSPs using said third bus;

wherein said master DSP receives data from said third bus, performs operations, and writes data to said CSP logic using said third bus;

wherein said slave DSP identically mirrors said data receive operations of said master DSP and identically mirrors operation of said master DSP, wherein when said master DSP writes data onto said third bus, said slave DSP also generates write data, said slave DSP including:

third bus comparison means which receives write data presented by said master DSP onto said third bus and also receives said write data generated by said slave DSP for comparing said master DSP write data with said slave CPU write data and for generating said mirror error signal; and wherein said clock disabling means is further coupled to said third bus comparison means and disables said clock signal generating means when said mirror error signal indicates that said master DSP write data does not equal said slave DSP write data.

3. A computer system which includes tightly coupled mirrored CPUs for design debug and testing purposes, comprising:

a host bus having address, data and control portions;

clock signal generating means which generates a clocking signal used by said computer system;

memory coupled to said host bus for storing instructions and data that can be presented onto said host bus;

a master CPU coupled to said host bus which reads instructions and data from said memory using said host bus, executes instructions, and writes data to said memory using said host bus;

a slave CPU coupled to said host bus which identically mirrors said data and instruction reads of said master CPU and identically mirrors instruction execution of said master CPU, wherein when said master CPU writes data onto said host bus, said slave CPU also generates write data, said slave CPU including:

write data comparison means which receives write data presented by said master CPU onto said host bus and also receives said slave CPU write data for comparing said master CPU write data with said slave CPU write data and for generating a mirror error signal indicative thereof;

clock disabling means coupled to said write data comparison means for disabling said clock signal generating means when said mirror error signal indicates that said master CPU write data does not equal said slave CPU write data; and means for generating a synchronizing signal that is provided to the master and slave CPUs, said master and slave CPUs each further including:

a timer having an output which generates timing signals for its respective CPU, said timer including a clock input receiving said synchronizing signal, wherein said timers in said master and slave CPUs operate in lockstep according to said synchronizing signal.

4. The computer system of claim 3, said master and slave CPUs each further including:

a processor which writes data to said timer; and means for disabling said synchronizing signal to said timer during writes to said timer.

5. The computer system of claim 4, wherein said clock signal generating means further generates a host bus clocking signal used to control timing of said host bus, said host bus clocking signal being asynchronous with said synchronizing signal; and wherein said master and slave CPUs each further include:

first means coupled between said timer clock input and said clock signal generating means for receiving said synchronizing signal and for synchronizing said synchronizing signal to said host bus clocking signal.

6. The computer system of claim 5, wherein said host bus clocking signal has positive and negative edges, wherein said first means synchronizes said synchronizing signal to said positive edge of said host bus clocking signal; and wherein said master and slave CPUs each further include:

second means coupled between said first means and said timer clock input for receiving said synchronizing signal output from said first means and for synchronizing said synchronizing signal to said negative edge of said host bus clocking signal.

7. The computer system of claim 6, wherein said master and slave CPUs each further include:

third means coupled to said timer output for synchronizing said timer output signal to said host bus clocking signal; and fourth means connected to said third means for receiving said synchronized timer output signal output from said third means and for synchronizing said synchronized timer output signal to said negative edge of said host bus clocking signal.

8. A computer system which includes tightly coupled mirrored CPUs for design debug and testing purposes, comprising:

a host bus having address, data and control portions;

clock signal generating means which generates a clocking signal used by said computer system;

memory coupled to said host bus for storing instructions and data that can be presented onto said host bus;

a master CPU coupled to said host bus which reads instructions and data from said memory using said host bus, executes instructions, and writes data to said memory using said host bus;

a slave CPU coupled to said host bus which identically mirrors said data and instruction reads of said master CPU and identically mirrors instruction execution of said master CPU, wherein when said master CPU writes data onto said host bus, said slave CPU also generates write data, said slave CPU including:

write data comparison means which receives write data presented by said master CPU onto said host bus and also receives said slave CPU write data for comparing said master CPU write data with said slave CPU write data and for generating a mirror error signal indicative thereof;

clock disabling means coupled to said write data comparison means for disabling said clock signal generating means when said mirror error signal indicates that said master CPU write data does not equal said slave CPU write data;

an expansion bus coupled to said host bus;

devices coupled to said expansion bus which generate a plurality of interrupt requests; and interrupt receive means coupled to said expansion bus for receiving interrupt requests generated by said expansion bus devices and for providing said interrupt requests to said master and slave CPUs; and wherein said master and slave CPUs each further comprise:

a processor;

an interrupt controller which receives said interrupt requests from said interrupt receive means and provides an interrupt signal to said CPU's processor; and interrupt controller synchronization means including means coupled between said interrupt controller and said processor for synchronizing said interrupt signal provided to said processor to a clocking signal.

9. The computer system of claim 8, wherein said interrupt controller synchronization means in each of said CPUs further includes:

means coupled between said interrupt receive means and said interrupt controller for synchronizing said interrupt requests to said clocking signal.

10. The computer system of claim 8, wherein said interrupt signal provided to said processor includes two states, each of said plurality of interrupt requests include two states, and said processor can write to said interrupt controller, wherein said interrupt controller synchronization means further includes:

means coupled between said interrupt controller and said processor for preventing said interrupt signal from changing state during either an interrupt request signal change or a processor write to said interrupt controller.

11. The computer system of claim 10, wherein said interrupt controller further comprises:

a first interrupt controller unit;

a second interrupt controller unit cascaded with said first interrupt controller unit, wherein said first and second interrupt controller units each receive a plurality of interrrupt requests and generate one interrupt signal, wherein the interrupt signal from said second interrupt controller unit is provided to an interrupt request input of said first interrupt controller unit; and means coupled between said first and second interrupt controller units receiving said interrupt signal from said second interrupt controller unit and for preventing said interrupt signal from changing state during either an interrupt request signal change or a processor write to said interrupt controller, said means providing said prevented interrupt signal to said first interrupt controller unit.

12. A computer system which includes tightly coupled mirrored CPUs for design debug and testing purposes, comprising:

a host bus having address, data and control portions;

memory coupled to the host bus for storing instructons and data that can be presented onto said host bus;

a master CPU coupled to said host bus which reads instructions and data from said memory using said host bus, executes instructions, and writes data to said memory using said host bus;

a slave CPU coupled to said host bus which identically mirrors said data and instruction reads of said master CPU and identically mirrors instruction execution of said master CPU, wherein when said master CPU writes data onto said host bus, said slave CPU also generates write data;

comparing means coupled to said master CPU and said slave CPU for comparing certain operations of said master CPU and slave CPU and for generating a signal indicative thereof; and means for generating a synchronizing signal that is provided to the master and slave CPUs, and wherein said master and slave CPUs each further include:

a timer having an output which generates timing signals for its respective CPU, said timer including a clock input receiving said synchronizing signal, wherein said timers in said master and slave CPUs operate in lockstep according to said synchronizing signal.

13. The computer system of claim 12, wherein said master and slave CPUs each further include:

a processor which writes data to said timer; and means for disabling said synchronizing signal to said timer during writes to said timer.

14. The computer system of claim 13, further including clock signal generating means for generating a host bus clocking signal used to control timing of said host bus, and wherein said master and slave CPUs each further include:

first means coupled between said timer clock input and said clock signal generating means for receiving said synchronizing signal and for synchronizing said synchronizing signal to said host bus clocking signal.

15. The computer system of claim 14, wherein said host bus clocking signal has positive and negative edges, wherein said first means synchronizes said synchronizing signal to said positive edge of said host bus clocking signal, and wherein said master and slave CPUs each further include:

second means coupled between said first means and said timer clock input for receiving said synchronizing signal output from said first means and for synchronizing said synchronizing signal to said negative edge of said host bus clocking signal.

16. The computer system of claim 15, said master and slave CPUs each further including:

third means coupled to said timer output for synchronizing said timer output signal to said host bus clocking signal; and fourth means connected to said third means for receiving said synchronized timer output signal output from said third means and for synchronizing said synchronized timer output signal to said negative edge of said host bus clocking signal.

17. A computer system which includes tightly coupled mirrored CPUs for design debug and testing purposes, comprising:

a host bus having address, data and control portions;

memory coupled to the host bus for storing instructons and data that can be presented onto said host bus;

a master CPU coupled to said host bus which reads instructions and data from said memory, executes instructions, and writes data to said memory using said host bus;

a slave CPU coupled to the host bus which identically mirrors said data and instruction reads of said master CPU and identically mirrors instruction execution of said master CPU, wherein when said master CPU writes data onto said host bus, said slave CPU also generates write data;

comparing means coupled to said master CPU and said slave CPU for comparing certain operations of said master CPU and slave CPU and for generating a signal indicative thereof;

an expansion bus coupled to said host bus;

devices coupled to said expansion bus which generate a plurality of interrupt requests; and interrupt receive means coupled to said expansion bus for receiving interrupt requests generated by said expansion bus devices and for providing said interrupt requests to said master and slave CPUs; and wherein said master and slave CPUs each further comprise:

a processor;

an interrupt controller which receives said interrupt requests from said interrupt receive means and provides an interrupt signal to said CPU's processor; and interrupt controller synchronization means including means coupled between said interrupt controller and said processor for synchronizing said interrupt signal provided to said processor to a clocking signal.

18. The computer system of claim 17, wherein said interrupt controller synchronization means in each of said CPUs further includes:

means coupled between said interrupt receive means and said interrupt controller for synchronizing said interrupt requests to said clocking signal.

19. The computer system of claim 17, wherein said interrupt signal provided to said processor includes two states, each of said plurality of interrupt requests include two states, and said processor can write to said interrupt controller, wherein said interrupt controller synchronization means further includes:

means coupled between said interrupt controller and said processor for preventing said interrupt signal from changing state during either an interrupt request signal change or a processor write to said interrupt controller.

* * * * *